(12) United States Patent
Chang et al.

(10) Patent No.: US 12,473,523 B2
(45) Date of Patent: Nov. 18, 2025

(54) REACTOR MODULE AND BIOMECHANICAL TESTING SYSTEM HAVING THE SAME

(71) Applicant: Sheng-Chih Chang, Kaohsiung (TW)

(72) Inventors: Sheng-Chih Chang, Kaohsiung (TW); Jeng-Long Hsieh, Kaohsiung (TW)

(73) Assignee: Sheng-Chih Chang, Kaohsiung (TW)

( * ) Notice: Subject to any disclaimer, the term of this patent is extended or adjusted under 35 U.S.C. 154(b) by 897 days.

(21) Appl. No.: 17/698,572

(22) Filed: Mar. 18, 2022

(65) Prior Publication Data

US 2023/0295548 A1    Sep. 21, 2023

(51) Int. Cl.
*C12M 1/00* (2006.01)
*C12M 3/00* (2006.01)

(52) U.S. Cl.
CPC ............ *C12M 23/38* (2013.01); *C12M 23/46* (2013.01); *C12M 23/50* (2013.01); *C12M 29/14* (2013.01)

(58) Field of Classification Search
CPC ...... C12M 23/38; C12M 23/46; C12M 23/50; C12M 29/14

USPC ....................................................... 435/289.1
See application file for complete search history.

(56) References Cited

U.S. PATENT DOCUMENTS

2017/0145365 A1*  5/2017  Nozaki .................. C12M 23/34
2021/0155892 A1*  5/2021  Mairesse ................ C12M 29/10

* cited by examiner

*Primary Examiner* — Michael L Hobbs
*Assistant Examiner* — Lenora A Abel
(74) *Attorney, Agent, or Firm* — MUNCY, GEISSLER, OLDS & LOWE, P.C.

(57) ABSTRACT

A reactor module includes a lower body, an upper body, a top cover and a culture vessel. The lower body defines and surrounds a bottom space that has an upper opening. The upper body is detachably connected atop the lower body. The top cover is disposed atop the upper body, and cooperatives with the upper body to define a receiving space that is disposed above the bottom space. The culture vessel is removably received in the receiving space, defines a culture reservoir, and includes a film member that is disposed under the culture reservoir, and that blocks the upper opening of the bottom space.

21 Claims, 12 Drawing Sheets

REACTOR MODULE AND BIOMECHANICAL TESTING SYSTEM HAVING THE SAME

FIELD

The disclosure relates to a biomechanical testing system, and more particularly to a reactor module and a biomechanical testing system having the same.

BACKGROUND

In the study of cell reactions, conventional simulations of physiological environments in the human or animal body is often performed on experimental animals. In order to achieve a certain degree of accuracy, often a large number of experimental animals are sacrificed for analyzing the various reactions of cells in different biological environments, which has been a persistent issue in the field.

SUMMARY

Therefore, the object of the disclosure is to provide a reactor module that can simulate movements of a living tissue.

According to an aspect of the disclosure, a reactor module includes a lower body, an upper body, a top cover and a culture vessel. The lower body defines and surrounds a bottom space that has an upper opening. The upper body is detachably connected atop the lower body. The top cover is disposed atop the upper body, and cooperates with the upper body to define a receiving space that is disposed above the bottom space. The culture vessel is removably received in the receiving space, defines and surrounds a culture reservoir, and includes a film member that is disposed under the culture reservoir, and that blocks the upper opening of the bottom space.

According to another aspect of the disclosure, a biomechanical testing system includes a reactor module and a supply unit.

The reactor module includes a lower body, an upper body, a top cover and a culture vessel. The lower body defines and surrounds a bottom space that has an upper opening. The upper body is detachably connected atop the lower body. The top cover is disposed atop the upper body, and cooperates with the upper body to define a receiving space that is disposed above the bottom space. The culture vessel is removably received in the receiving space, defines and surrounds a culture reservoir, and includes a film member that is disposed under the culture reservoir, and that blocks the upper opening of the bottom space.

The supply unit is adapted to supply a fluid into one of the bottom space of the reactor module and the culture reservoir of the reactor module so as to push and move the central portion of the film member vertically relative to the upper and lower bodies.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 1:
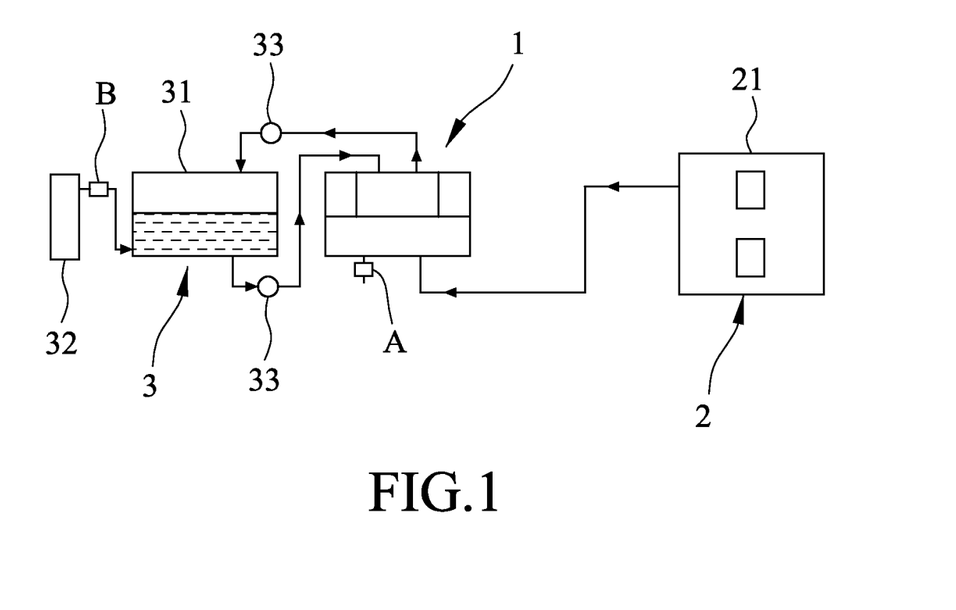
FIG. 1 is a schematic diagram illustrating a first embodiment of a biomechanical testing system according to the disclosure.
Figure 2:
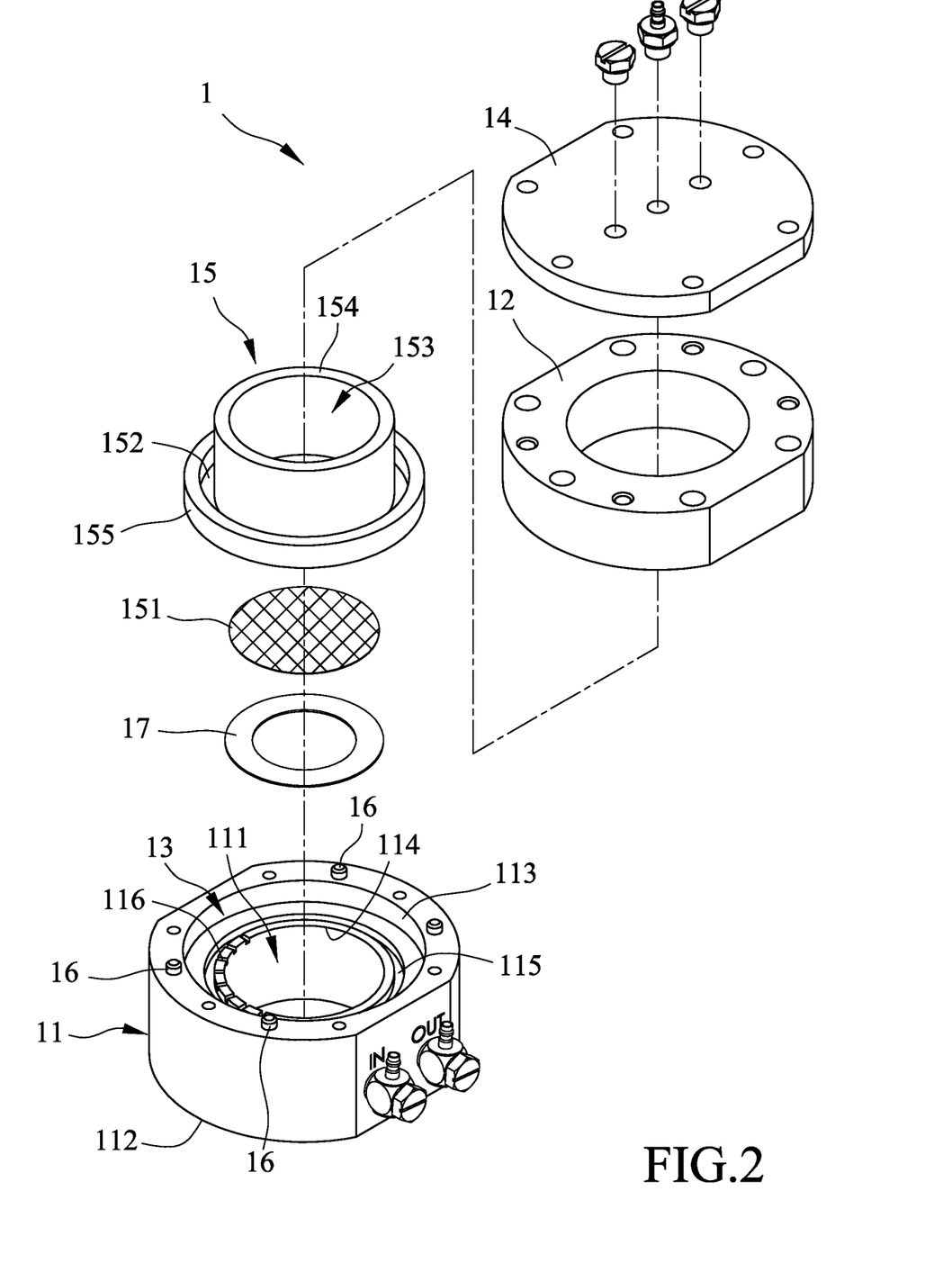
FIG. 2 is an exploded perspective view of a reactor module of the first embodiment.
Figure 3:
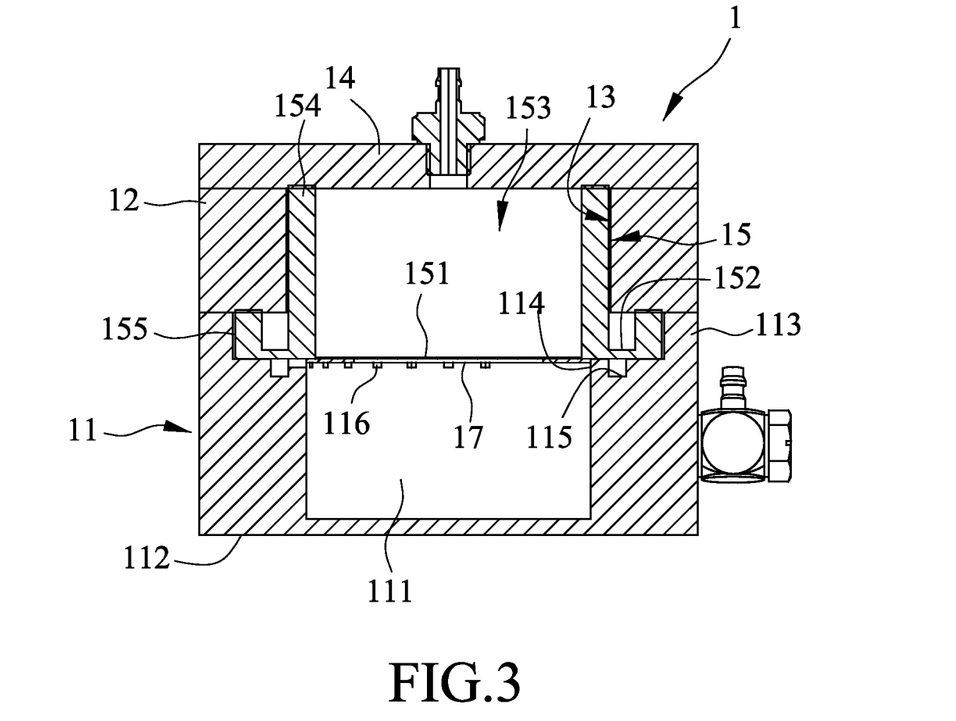
FIG. 3 is a side sectional view of the reactor module.

Referring to FIGS. 1, 2 and 3, a first embodiment of a biomechanical testing system according to the disclosure includes a reactor module 1, a supply unit 2 and an exchange unit 3.

Figure 4:
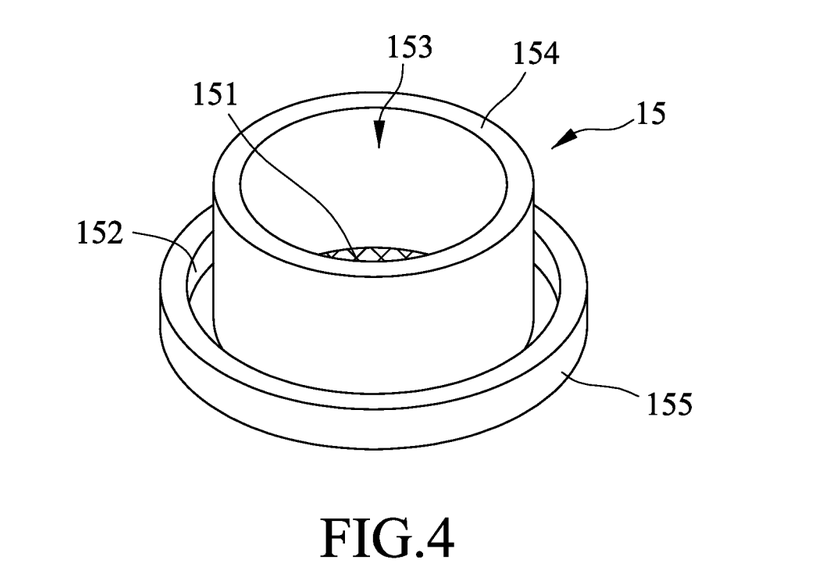
FIG. 4 is a perspective view of a culture vessel of the reactor module.

Referring to FIGS. 2, 3 and 4, the reactor module 1 includes a lower body 11, an upper body 12, a top cover 14, a culture vessel 15 and four positioning pins 16. The upper body 12 is detachably connected atop the lower body 11. The top cover 14 is disposed atop the upper body 12, and cooperatives with the upper body 12 to define a receiving space 13. The culture vessel 15 is removably received in the receiving space 13. The positioning pins 16 are inserted upwardly into a bottom end of the upper body 12 and downwardly into a top end of the lower body 11 for positioning the upper body 12 and the lower body 11 relative to each other.

The lower body 11 has a main body portion 112 that defines and surrounds a bottom space 111, and a top wall portion 113 that protrudes upwardly from a top surface of the main body portion 112. The bottom space 111 is disposed under the receiving space 13, and has an upper opening 114 that opens upwardly. The main body portion 112 has an annular groove 115 that is formed in the top surface thereof, that surrounds the upper opening 114 of the bottom space 111, and that is surrounded by the top wall portion 113. The upper body 12 is fixed to the main body portion 112 via the positioning pins 16 and a plurality of screws (not shown).

It should be noted that the top surface of the main body portion 112 may be formed with a plurality of overflow grooves 116, as shown in FIG. 2, that are arranged at intervals in a circumferential direction, and that are surrounded by the annular groove 115. Each of the overflow grooves 116 spatially interconnects the annular groove 115 and the bottom space 111. As such, when a liquid flows from the annular groove 115 into the bottom space 111 via the overflow grooves 116, the overflow grooves 116 cause the liquid to flow into the bottom space 111 in a downward manner, avoiding turbulence caused by the liquid entering directly into the bottom space 111 without the overflow grooves 116.

The culture vessel 15 defines and surrounds a culture reservoir 153, and includes a film member 151, a bottom annular wall 152, an inner surrounding wall 154, and an outer annular wall 155.

The film member 151 is disposed in the receiving space 13 and blocks the upper opening 114 of the bottom space 111. The bottom annular wall 152 surrounds and is connected to the film member 151, and is disposed above the annular groove 115 of the lower body 11. The inner surrounding wall 154 protrudes upwardly from an inner periphery of the bottom annular wall 152, is surrounded by the upper body 12, and cooperates with the film member 151 to define the culture reservoir 153 that is disposed above the film member 151, and that opens upwardly and towards the top cover 14. The outer annular wall 155 is surrounded by the top wall portion 113 of the lower body 11, and protrudes upwardly from an outer periphery of the bottom annular wall 152 such that the outer annular wall 155 surrounds and is spaced apart from the inner surrounding wall 154. The outer annular wall 155 and the bottom annular wall 152 are confined and positioned between the main body portion 112 of the lower body 11 and the upper body 12 in an up-down direction.

In the present embodiment, the film member 151 is made of silicone, and is integrally formed with the rest of the culture vessel 15 as one piece (all made of silicone). In a variation of the present embodiment, the film member 151 is made of a biomedical material and the reactor module 1 further includes a limiting annular plate 17 (see FIG. 2) that is connected to a bottom surface of the bottom annular wall 152. The limiting annular plate 17 and the bottom annular wall 152 are made of the same material, such as silicone, and the limiting annular plate 17 cooperates with the bottom annular wall 152 to clamp the film member 151 therebetween. In this case, the limiting annular plate 17 has an outer diameter greater than that of the film member 151 such that the limiting annular plate 17 is configured to be seamlessly attached to the bottom surface of the bottom annular wall 152.

Referring again to FIGS. 1, 2 and 3, the supply unit 2 is adapted to supply a fluid into one of the bottom space 111 of the reactor module 1 and the culture reservoir 153 of the reactor module 1 so as to push and move a central portion of the film member 151 vertically relative to the upper and lower bodies 12, 11. In the present embodiment, the supply unit 2 includes a gas source 21 connected fluidly to the lower body 11 of the reactor module 1 via a soft silicone tube, such that the supply unit 2 is in fluid communication with the bottom space 111. The lower body 11 is provided with a solenoid valve (A).

The exchange unit 3 includes a culture tank 31, a gas supply 32, two pumps 33, and a solenoid valve (B) (see FIG. 1). The culture tank 31 is adapted to hold a culture medium and connected fluidly to the culture reservoir 153 of the reactor module 1 via the top cover 14. The gas supply 32 is adapted to exchange gas (e.g., carbon dioxide) with the culture tank 31. The pumps 33 are adapted to force the culture medium to circulate between the culture tank 31 and the culture reservoir 153 of the culture vessel 15.

During a simulation operation of the first embodiment, the supply unit 2 is adapted to supply a gas into the bottom space 111 of the reactor module 1 so as to push the central portion of the film member 151 upwards. Specifically, the gas source 21 of the supply unit 2 is controlled via a programmable gas pressure controller, so that the gas enters the bottom space 111 through the lower body 11 and pushes the film member 151 that is disposed above the bottom space 111, causing the central portion of the film member 151 to rise (i.e., the film member 151 bulges upwards). During this process, the gas supply 32 controls the supply of the carbon dioxide in the culture tank 31 through operation of the solenoid valve (B), and regularly exchanges the culture medium between the culture tank 31 and culture reservoir 153 via the pumps 33. When the simulation is completed, the solenoid valve (A) of the lower body 11 may be switched open to relieve the pressure. In addition, the gas source 21 may also be controlled to input gas in a pulsed manner, such that the central portion of the film member 151 moves vertically in the pulsed manner.

Figure 5:
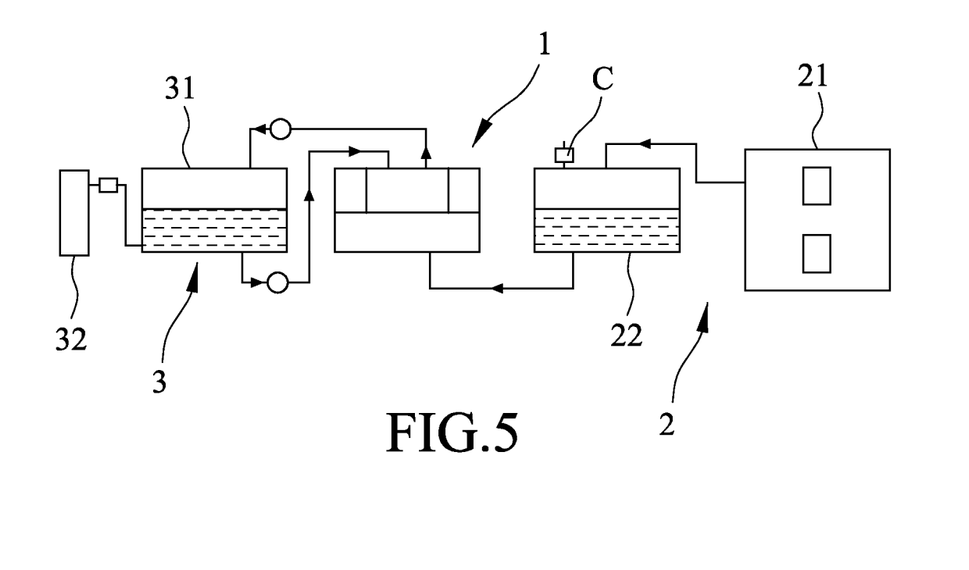
FIG. 5 is a schematic diagram illustrating a second embodiment of the biomechanical testing system according to the disclosure.

Referring to FIGS. 3 and 5, a second embodiment of the biomechanical testing system according to the disclosure is similar to the first embodiment, and the difference between the two lies in that, in the second embodiment, the gas source 21 is not directly connected to the bottom space 111 of the reactor module 1, and the supply unit 2 further includes a buffer tank 22 that is connected fluidly between the gas source 21 and the bottom space 111, and that is adapted to hold a liquid (e.g., the culture medium or other suitable liquids).

In the present embodiment, when the gas source 21 inputs gas to the buffer tank 22, the liquid in the buffer tank 22 is forced to flow into the bottom space 111 of the reactor module 1 under gas pressure, thereby pushing the central portion of the film member 151 upwards. Compared with the first embodiment that pushes the film member 151 by the gas pressure, the second embodiment pushes the film member 151 by liquid pressure, providing another option for the simulation and increasing its applicability. In addition, the buffer tank 22 may be provided with a solenoid valve (C), and when the solenoid valve (C) is operated to release the pressure, the liquid flows back to the buffer tank 22, and the film member 151 returns to its original state, where the simulation may be started again or be terminated.

Figure 6:
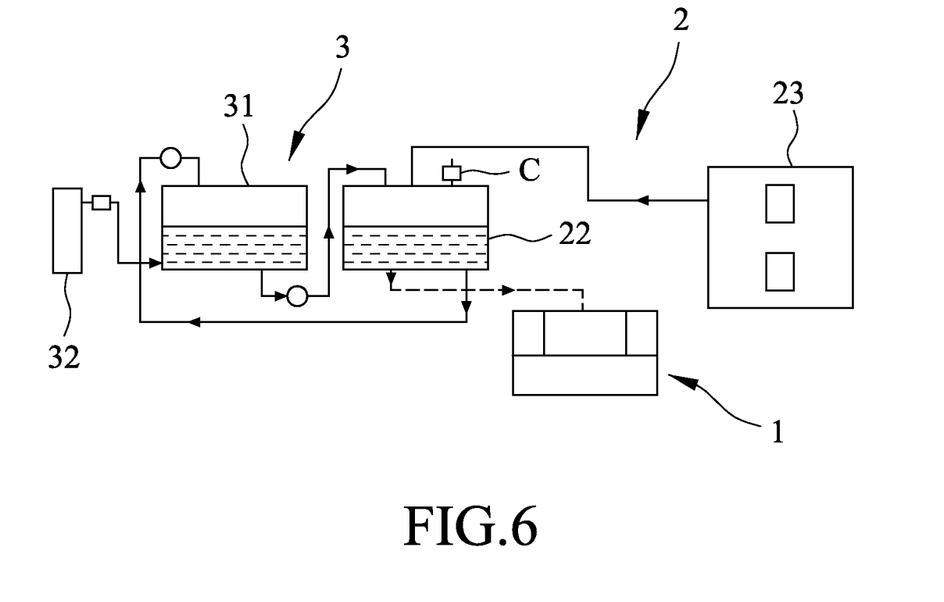
FIG. 6 is a schematic diagram illustrating a third embodiment of the biomechanical testing system according to the disclosure.

Referring to FIGS. 3 and 6, a third embodiment of the biomechanical testing system according to the disclosure is also similar to the first embodiment, and the difference between the two lies in that, in the third embodiment, the buffer tank 22 is not connected to the bottom space 111 of the reactor module 1, but is connected fluidly to the culture tank 31 and the culture reservoir 153 of the reactor module 1, and the supply unit 2 does not include the gas source 21, but includes a gas input source 23 that is connected fluidly to the buffer tank 22.

In the present embodiment, the gas input source 23 is adapted to input a gas into the buffer tank 22 so as to force the liquid in the buffer tank 22 to flow into the culture reservoir 153 of the reactor module 1 under gas pressure, thereby pushing the central portion of the film member 151 downwards. In addition, the buffer tank 22 is provided with the solenoid valve (C), and when the solenoid valve (C) is operated to release the pressure, the liquid flows back to the buffer tank 22 (i.e., the liquid circulates between the culture tank 31 and the buffer tank 22), and the film member 151 returns to its original state for the simulation to be started again or be terminated. As such, the third embodiment provides yet another option for the simulation, in which the film member 151 is pushed in a different manner.

Figure 7:
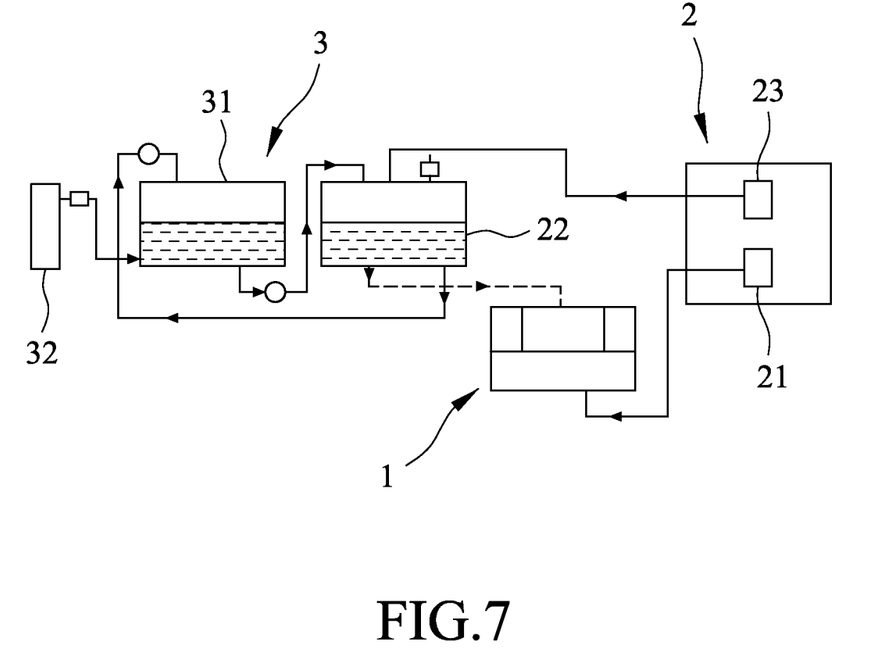
FIG. 7 is a schematic diagram illustrating a fourth embodiment of the biomechanical testing system according to the disclosure.

Referring to FIGS. 3 and 7, a fourth embodiment of the biomechanical testing system according to the disclosure is similar to the third embodiment, and the difference between the two lies in that, in the fourth embodiment, the supply unit 2 includes the gas source 21 that is connected to the bottom space 111. As such, the film member 151 is configured to be pushed upwards through the gas source 21 (same as in the first embodiment), and the gas is input into the buffer tank 22 through the gas input source 23 to force the liquid in the buffer tank 22 into the culture reservoir 153, thereby causing the central portion of the film member 151 to move downwards (same as in the third embodiment).

It should be noted that, the gas source 21 and the gas input source 23 are not opened at the same time, so the film member 151 will not be pushed simultaneously by the gas (upwards) and the liquid (downwards). Specifically, the film member 151 will first be pushed in one direction (e.g., upwards), and after the film member 151 returns to its original state, it is then pushed in the other direction (e.g., downwards). As such, the film member 151 may repeat the aforementioned movements to provide yet another simulation effect.

Figure 8:
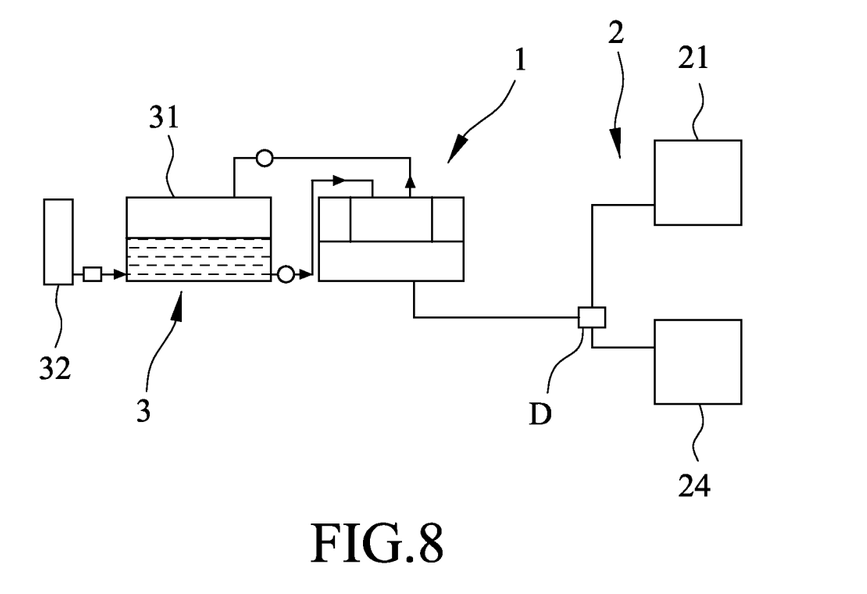
FIGS. 8 and 9 are schematic diagrams illustrating a fifth embodiment of the biomechanical testing system according to the disclosure.
Figure 9:
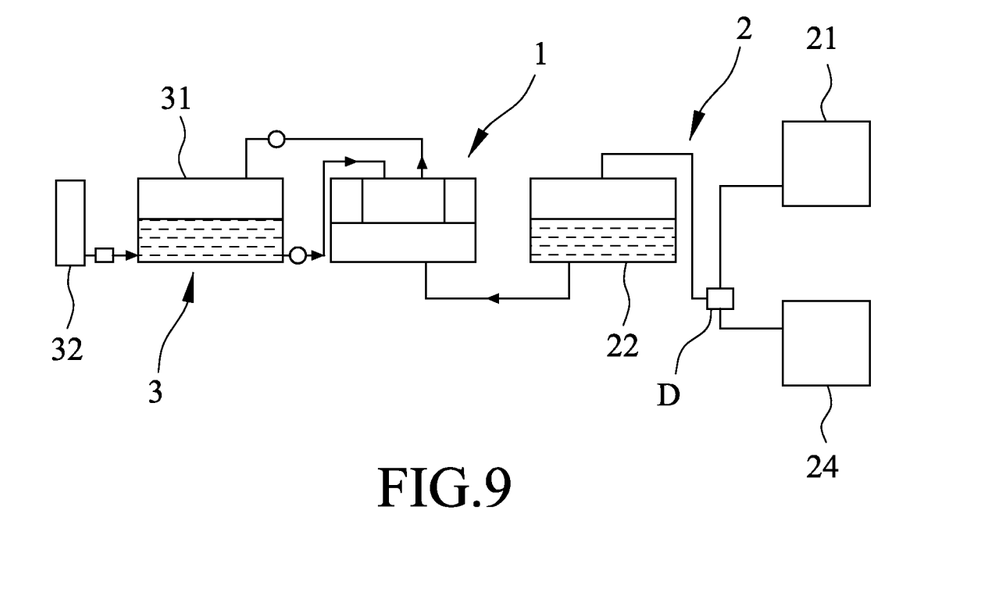

Referring to FIGS. 2, 8 and 9, a fifth embodiment of the biomechanical testing system according to the disclosure is also similar to the first embodiment, and the difference between the two lies in that, in the fifth embodiment, the supply unit 2 further includes an independent negative pressure source 24 that is connected fluidly to the bottom space 111 of the reactor module 1, that is connected to a solenoid valve (D) connected with the gas source 21, and that is activated and deactivated through operation of the solenoid valve (D).

Specifically, the independent negative pressure source 24 is adapted to draw gas (see FIG. 8) or liquid (see FIG. 9) out of the bottom space 111, such that the independent negative pressure source 24 cooperates with the gas source 21 to drive the movement of the film member 151. By virtue of such configuration, the film member 151 is able to move at a faster speed. That is, after being pushed upwards, the central portion of the film member 151 is able to quickly return to its original state (or be pushed downwards). In addition, the independent negative pressure source 24 may also be connected to the culture reservoir 153 for drawing liquid or gas therefrom, which also increases the moving speed of the film member 151.

Figure 10:
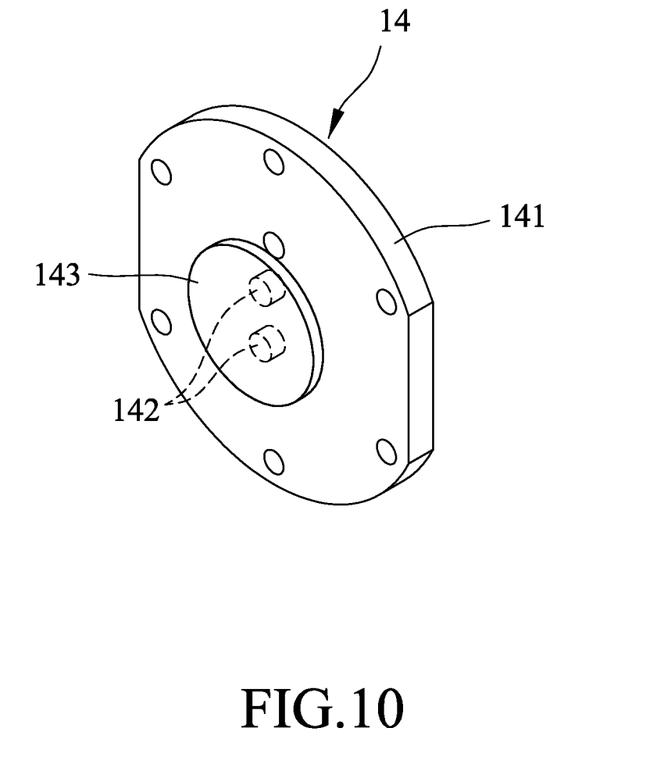
FIG. 10 is a perspective view illustrating an alternative configuration of an upper cover of the reactor module.
Figure 11:
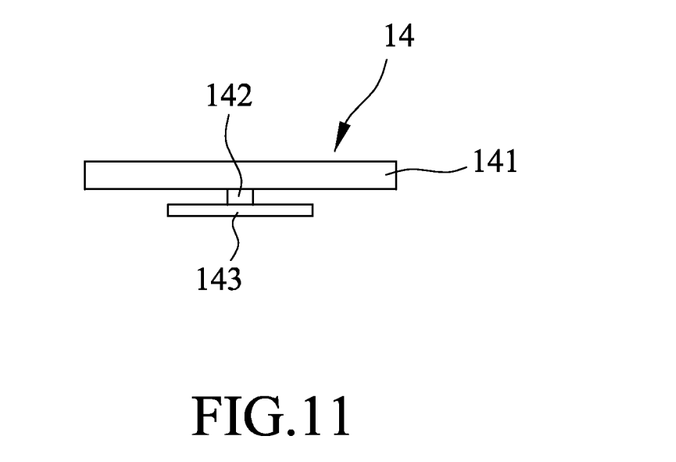
FIG. 11 is a side view illustrating the alternative configuration of the upper cover shown in FIG. 10.

Referring to FIGS. 2, 10, and 11, it should be noted that the top cover 14 is not limited to the configuration shown in FIG. 2. In variations of the previous embodiments, the top cover 14 may have a different configuration as shown in FIGS. 10 and 11.

In this configuration, the top cover 14 includes a cover portion 141, a blocking plate portion 143 that is spaced apart from the cover portion 141 and that is disposed in the culture reservoir 153 of the culture vessel 15, and two connecting columns 142 that interconnect the cover portion 141 and the blocking plate portion 143. When the gas source 21 directly inputs gas into the culture reservoir 153 as described in the first embodiment (see FIG. 1), or when the gas input source 23 forces the culture medium into the culture reservoir 153 as described in the third embodiment (see FIG. 6), the blocking plate portion 143 will block the gas or the culture medium such that fluid pressure is evenly distributed in the culture reservoir 153 to avoid pressure concentration and prevent testing results from being affected adversely.

Figure 12:
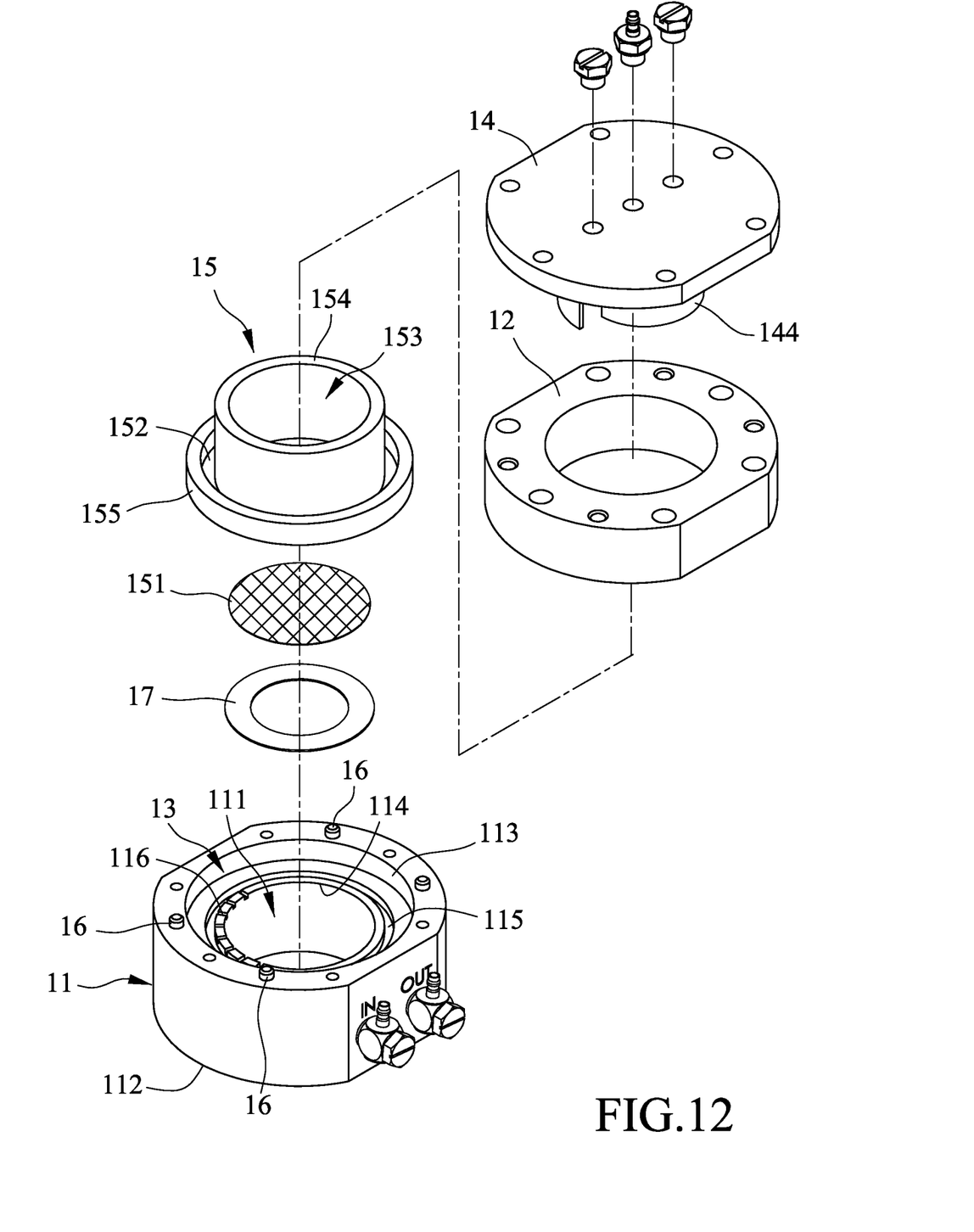
FIG. 12 is an exploded perspective view of the reactor module, illustrating another alternative configuration of the upper cover.
Figure 13:
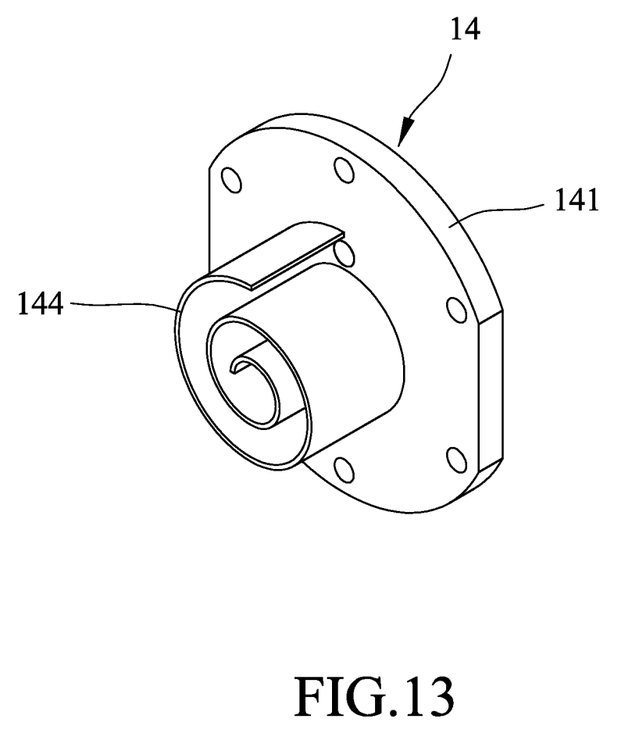
FIG. 13 is a perspective view illustrating the another alternative configuration of the upper cover shown in FIG. 12.

Referring to FIGS. 12 and 13, in yet another configuration of the top cover 14, the top cover 14 includes a cover portion 141, and a guiding portion 144 that protrudes from the cover portion 141 into the culture reservoir 153 of the culture vessel 15, and that has a spiral-shaped cross section. When the culture medium is forced into the culture reservoir 153, it flows along the scroll-shaped structure of the guiding portion 144, thereby generating fluid shear stress suitable for related simulations. It should be noted that the guiding portion 144 is not limited to being a part of the top cover 14. That is, in other variations, the guiding portion 144 may be configured as a separate component without being connected to the cover portion 141, and may be directly disposed in the culture reservoir 153, or omitted, as required.

Figure 14:
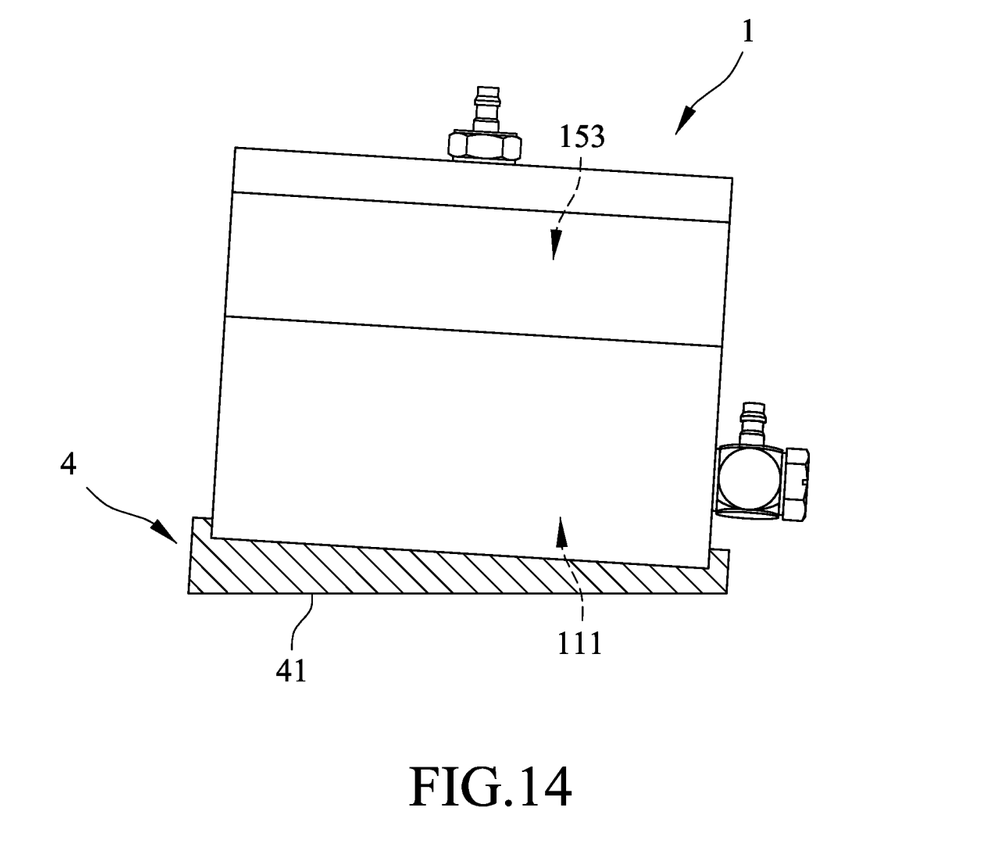
FIG. 14 is a side sectional view illustrating the reactor module being disposed on a fixing fixture.

Referring to FIG. 14, in a variation of the previous embodiments, the biomechanical testing system further includes a fixing fixture 4 that is provided for the reactor module 1 to be disposed thereon. The fixing fixture 4 has a top surface and an inclined bottom surface 41 that is inclined relative to the top surface, and that is adapted to be disposed on a level surface such that the reactor module 1 disposed on the fixing fixture 4 is inclined relative to the level surface, and the liquid held in the bottom space 111 and the culture reservoir 153 of the reactor module 1 is pulled by gravity toward one side of the reactor module 1 to be proximal to a liquid outlet. In such a manner, liquid residue can be reduced during simulation of a liquid discharging process.

Figure 15:
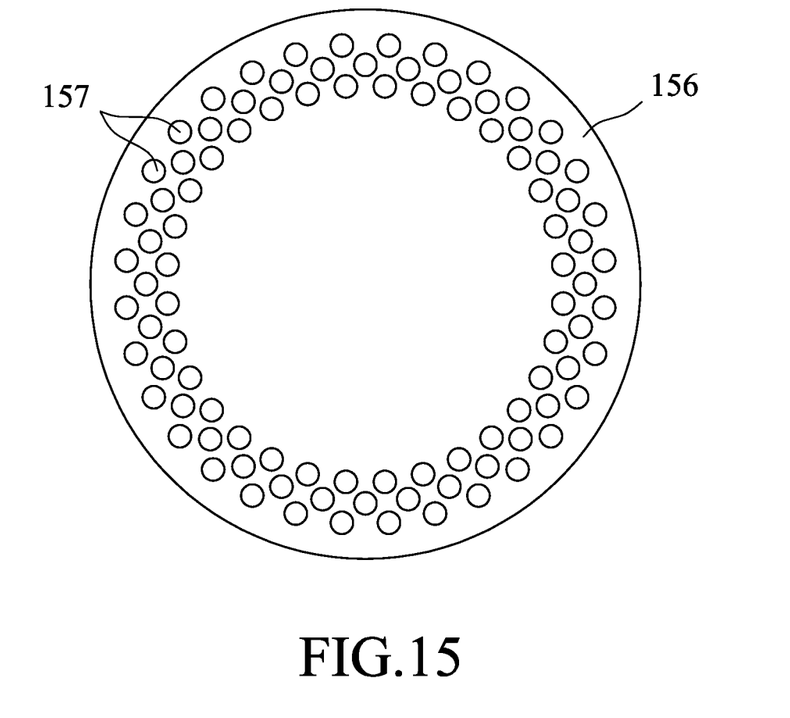
FIG. 15 is a schematic diagram illustrating a variation of a film member of the previous embodiments.
Figure 16:
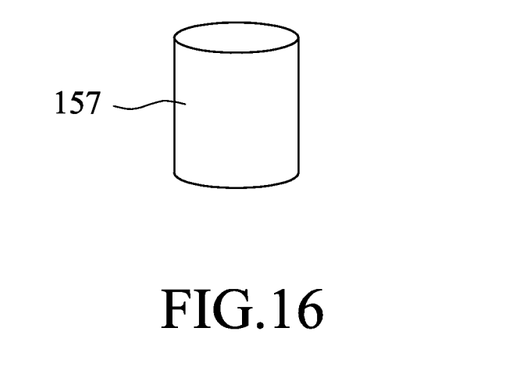
FIG. 16 is perspective schematic diagram illustrating a buffer protrusion of the film member in FIG. 15.
Figure 17:
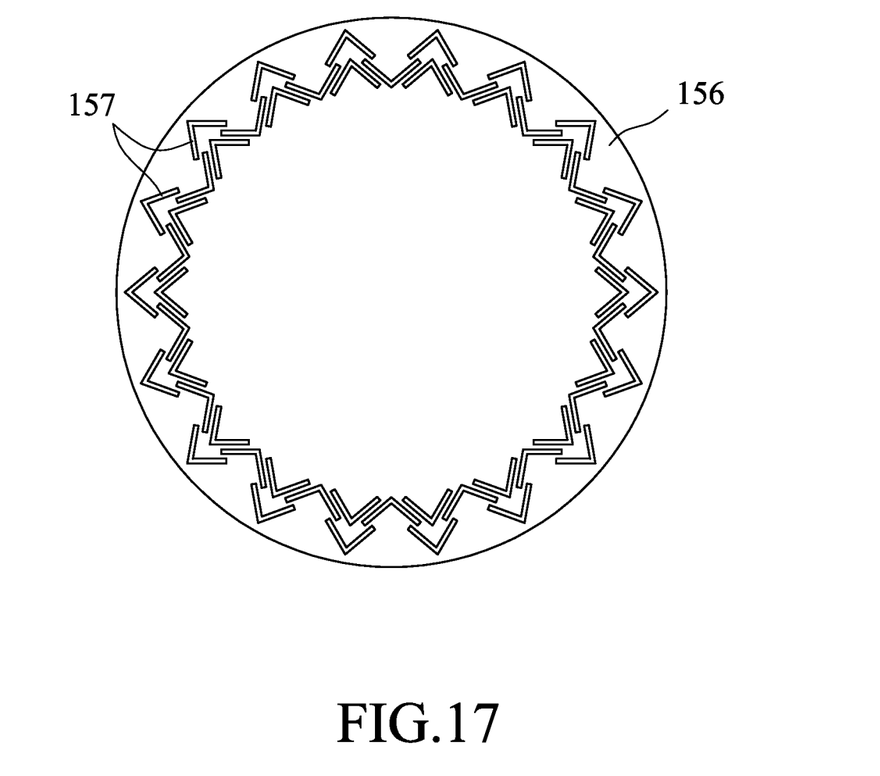
FIG. 17 is a schematic diagram illustrating another variation of the film member.

Referring to FIGS. 15 to 17 in conjunction with FIG. 12, in other variations of the previous embodiments, the film member 151 of the culture vessel 15 is configured as a round plate, and has a main layer portion 156 that is covered with bio-based material, and a plurality of buffer protrusions 157 that protrude from a top surface of the main layer portion 156. The buffer protrusions 157 may be configured as pillars, as shown in FIGS. 15 and 16, or as V-shaped waveforms, as shown in FIG. 17. It should be noted that, the buffer protrusions 157 are not limited to be arranged in the angularly-spaced manner as shown in FIGS. 15 and 17, and may be arranged in rows and columns. The buffer protrusions 157 are configured to abut against the bottom annular wall 152 so as to prevent the bottom annular wall 152 from pressing directly against and potentially damaging the bio-based material on the main layer portion 156.

In sum, the biomechanical testing system according to the disclosure has the following benefit. By virtue of the film member 151 of the culture vessel 15 being configured to be moved vertically at the central portion thereof by gas or liquid pressure to simulate movements of a living tissue, changes of cells in the culture reservoir 153 during cell culture may be observed under various conditions of simulation with high applicability and accuracy.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A reactor module comprising:
   a lower body defining and surrounding a bottom space that has an upper opening;
   an upper body detachably connected atop said lower body;
   a top cover disposed atop said upper body, and cooperatively defining with said upper body a receiving space that is disposed above said bottom space; and
   a culture vessel removably received in said receiving space, defining and surrounding a culture reservoir, and including a film member that is disposed under said culture reservoir, that has a central portion, and that blocks said upper opening of said bottom space;
   wherein, when a liquid enters said bottom space, said central portion of said film member is configured to be pushed upwards; and
   wherein, when a liquid enters said culture reservoir, said central portion of said film member is configured to be pushed downwards.

2. The reactor module as claimed in claim 1, wherein said culture vessel further includes:
   a bottom annular wall that surrounds and is connected to said film member;
   an inner surrounding wall that protrudes upwardly from an inner periphery of said bottom annular wall, that is surrounded by said upper body, and that cooperates with said film member to define said culture reservoir; and
   an outer annular wall that protrudes upwardly from an outer periphery of said bottom annular wall such that said outer annular wall surrounds and is spaced apart from said inner surrounding wall, said outer annular wall and said bottom annular wall being confined and positioned between said lower body and said upper body.

3. The reactor module as claimed in claim 2, wherein said lower body includes:
   a main body portion that surrounds said bottom space, said outer annular wall and said bottom annular wall of said culture vessel being disposed between said main body portion and said upper body in an up-down direction; and
   a top wall portion that protrudes upwardly from a top surface of said main body portion, and that surrounds said outer annular wall.

4. The reactor module as claimed in claim 3, wherein said main body portion of said lower body has a annular groove that is formed in said top surface thereof, that surrounds said upper opening of said bottom space, and that is disposed under said bottom annular wall of said culture vessel.

5. The reactor module as claimed in claim 4, further comprising a plurality of positioning pins inserted upwardly into a bottom end of said upper body and downwardly into a top end of said lower body for positioning said upper body and said lower body relative to each other.

6. The reactor module as claimed in claim 4, wherein said top surface of said main body portion of said lower body is formed with a plurality of overflow grooves that are arranged at intervals in a circumferential direction, and that are surrounded by said annular groove, each of said overflow grooves spatially interconnecting said annular groove and said bottom space.

7. The reactor module as claimed in claim 2, further comprising a limiting annular plate cooperating with said bottom annular wall to clamp said film member therebetween, said limiting annular plate and said bottom annular wall being made of the same material.

8. The reactor module as claimed in claim 1, wherein said top cover includes a cover portion, a blocking plate portion that is spaced apart from said cover portion and that is disposed in said culture reservoir of said culture vessel, and a plurality of connecting columns that interconnect said cover portion and said blocking plate portion.

9. The reactor module as claimed in claim 1, wherein said top cover includes a cover portion, and a guiding portion that protrudes from said cover portion into said culture reservoir of said culture vessel, and that has a spiral-shaped cross section.

10. The reactor module as claimed in claim 2, wherein said film member of said culture vessel has a main layer portion and a plurality of buffer protrusions, said buffer protrusions protruding from a top surface of said main layer portion and being configured to abut against said bottom annular wall.

11. A biomechanical testing system comprising:
    the reactor module as claimed in claim 1; and
    a supply unit adapted to supply a fluid into one of said bottom space of said reactor module and said culture reservoir of said reactor module so as to push and move the central portion of said film member vertically relative to said upper and lower bodies.

12. The biomechanics testing system of claim 11, wherein said supply unit includes a gas source connected fluidly to said reactor module, and adapted to supply a gas into said bottom space of said reactor module so as to push the central portion of said film member upwards.

13. The biomechanical testing system as claimed in claim 11, further comprising an exchange unit that includes a culture tank adapted to hold a culture medium and connected fluidly to said culture reservoir of said reactor module, a gas supply adapted to exchange the gas with said culture tank, and at least one pump adapted to force the culture medium to circulate between said culture tank and said culture reservoir.

14. The biomechanical testing system as claimed in claim 11, wherein said supply unit includes a buffer tank adapted to hold a liquid and connected fluidly to said reactor module, and a gas input source connected fluidly to said buffer tank, and adapted to input a gas into said buffer tank so as to force the liquid in said buffer tank to flow into said bottom space of said reactor module under gas pressure, thereby pushing the central portion of said film member upwards.

15. The biomechanical testing system as claimed in claim 14, further comprising an exchange unit that includes a culture tank adapted to hold a culture medium and connected fluidly to said culture reservoir of said reactor module, a gas supply adapted to exchange the gas with said culture tank, and at least one pump adapted to force the culture medium to circulate between said culture tank and said culture reservoir.

16. The biomechanical testing system as claimed in claim 14, wherein said supply unit includes a buffer tank adapted to hold the culture medium and connected fluidly to said reactor module, and a gas input source connected fluidly to said buffer tank, and adapted to input a gas into said buffer tank so as to force the culture medium in said buffer tank to flow into said culture reservoir of said reactor module under gas pressure, thereby pushing the central portion of said film member downwards.

17. The biomechanical testing system as claimed in claim 16, further comprising an exchange unit that includes a culture tank adapted to hold the culture medium and connected fluidly to said buffer tank, and a gas supply adapted to exchange the gas with said culture tank, and at least one pump adapted to force the culture medium to circulate between said culture tank and said buffer tank.

18. The biomechanical testing system as claimed in claim 11, wherein said supply unit includes a buffer tank adapted to hold the culture medium and connected fluidly to said reactor module, and a gas input source connected fluidly to said buffer tank, and adapted to input a gas into said buffer tank so as to force the culture medium in said buffer tank to flow into said culture reservoir of said reactor module under gas pressure, thereby pushing the central portion of said film member downwards.

19. The biomechanical testing system as claimed in claim 18, further comprising an exchange unit that includes a culture tank adapted to hold the culture medium and connected fluidly to said buffer tank, and a gas supply adapted to exchange the gas with said culture tank, and at least one pump adapted to force the culture medium to circulate between said culture tank and said buffer tank.

20. The biomechanical testing system as claimed in claim 11, wherein said supply unit includes an independent negative pressure source connected fluidly to said reactor module, and adapted to draw the fluid out of said reactor module.

21. The biomechanical testing system as claimed in claim 11, further comprising a fixing fixture that is provided for said reactor module to be disposed thereon, said fixing fixture having a top surface and an inclined bottom surface that is inclined relative to said top surface, and that is adapted to be disposed on a level surface.

* * * * *